United States Patent [19]
Sakata

[11] Patent Number: 5,179,593
[45] Date of Patent: Jan. 12, 1993

[54] FM STEREO RECEIVING DEVICE

[75] Inventor: Haruo Sakata, Tokyo, Japan

[73] Assignee: Clarion Co., Ltd., Tokyo, Japan

[21] Appl. No.: 767,238

[22] Filed: Sep. 27, 1991

[30] Foreign Application Priority Data

Oct. 8, 1990 [JP] Japan .................................. 2-270089
Apr. 15, 1991 [JP] Japan .................................. 3-109759

[51] Int. Cl.$^5$ ............................................. H04H 5/00
[52] U.S. Cl. ............................................ 381/3; 381/7; 381/13
[58] Field of Search .............................. 381/3, 4, 13, 7

[56] References Cited

FOREIGN PATENT DOCUMENTS 63-103527  5/1988  Japan .
1-279648  11/1989  Japan .
1-288123  11/1989  Japan .
1-288124  11/1989  Japan .
1-305736  12/1989  Japan .
1-318331  12/1989  Japan .
0121427    5/1990  Japan ..................................... 381/7
2-247816   9/1990  Japan .
3-101528   4/1991  Japan .

Primary Examiner—Jin F. Ng
Assistant Examiner—Nina Tang
Attorney, Agent, or Firm—Flynn, Thiel, Boutell & Tanis

[57] ABSTRACT

An FM stereo receiving device according to the present invention has an object to be able to demodulate a stereo signal in a state close to a monaural reception, in which a pilot signal is extracted from an FM-demodulated output; a subcarrier signal is formed, based on this pilot signal; IF signals are switched intermittently by this subcarrier signal; and intermittent IF signals are IF-detected to obtain intermittent signals of base-band signals.

These intermittent signals are switched by means of two switches, based on a subcarrier signal. Low frequency components of each output audio signal are extracted to obtain left and right signals EL and ER through a de-emphasis circuit.

Owing to this device, it is possible to enlarge a reception region for an FM stereo broadcast with a high sensitivity.

14 Claims, 11 Drawing Sheets

FIG. 7
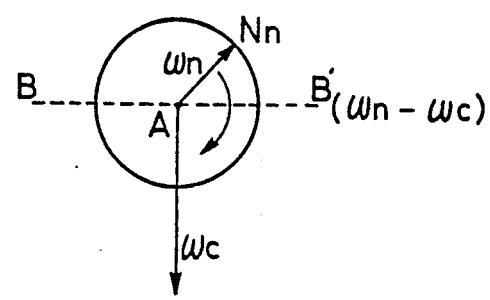
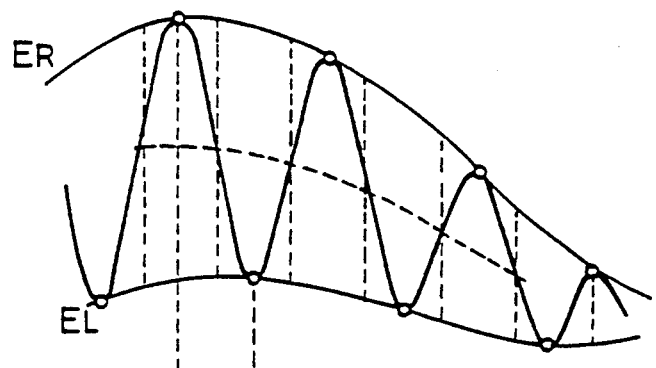
FIG. 10 (a)
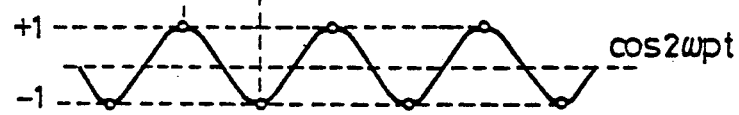
FIG. 10 (b)
FIG. 10 (c)
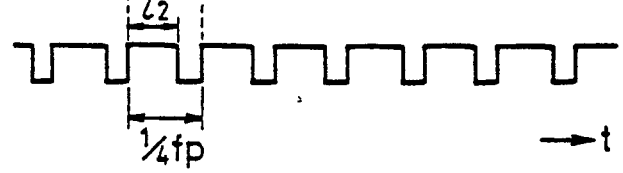
FIG. 10 (d)

1

FM STEREO RECEIVING DEVICE

FIELD OF THE INVENTION

The present invention relates to an FM stereo receiving device, and in particular to an improvement of an FM stereo receiving device capable of demodulating an FM stereo signal with a simple construction and an SN ratio close to that obtained by FM monaural reception by obtaining right and left side signals constituting a stereo signal while switching baseband signal components frequency-detected by using a subcarrier component signal.

BACKGROUND OF THE INVENTION

FIG. 14 indicates an example of the construction of a prior art FM stereo receiving device, in which reference numeral 1 is a receiving antenna; 2 is a frequency converter; 3 is a local oscillator; 4 is a limiter, 5 is a discriminator; 6 is a band pass filter for fp=19 kHz (pilot signal); 7 is an oscillator for 2 fp=38 kHz (subcarrier); 8 is a band pass filter having a pass band of 23 to 53 kHz; 9 is a low pass filter having a cut-off frequency of 15 kHz; 10 is a synchronous detecting circuit; 11 is a low pass filter having a cut-off frequency of 15 kHz; 12 is a matrix amplifier; 13 and 14 are de-emphasis circuits; 15 and 16 are ER and EL output terminals, respectively.

In FIG. 14, a signal received through the antenna 1 is applied to the frequency converter 2 to be converted into an IF signal having an IF (intermediate frequency) of 10.7 MHz, which is a difference frequency between the received signal and a signal coming from the local oscillator 3. The amplitude of this IF signal is limited by the limiter 4 and it is applied to the discriminator 5, where it is subjected to a conversion of frequency of FM-modulated wave-voltage to obtain a baseband signal. This baseband signal is applied to the band pass filter 6, from which a pilot signal of fp=19 kHz is taken out. The oscillator 7 starts a coupling oscillation by this signal.

On the other hand, the baseband signal described above is applied to the band pass filter 8 and a low pass filter 9 and a stereo difference signal EScos2ωpt having frequencies of 23 to 53 kHz taken out from the band pass filter 8 is sent to the synchronous detecting circuit 10. The synchronous detecting circuit 10 synchronous-detects the difference signal described above on the basis of an output signal cos2ωpt of the oscillator 7 described above. A stereo signal ES is obtained by taking out the detected output thus obtained through the low pass filter 11.

Further the low pass filter 9 outputs also a monaural signal EM. This monaural signal EM is applied to the matrix amplifier 12 together with the stereo signal ES described above. The signals ER and EL before the emphasis are obtained from these signals ES and EM. The right ear signal ER and the left ear signal EL are obtained by making these signals pass through the de-emphasis circuits 13 and 14.

FIG. 13 is a characteristic scheme indicating a baseband signal and a demodulation noise distribution in an FM broadcasted wave. As it can be understood from the frequency distribution of the baseband signal in the FM broadcasted wave indicated in the figure, when it is FM-demodulated, noise in the middle course has a distribution proportional to the baseband frequency indicated by a broken line in FIG. 13. For this reason, by the demodulating system indicated in FIG. 14 described above, since the SN ratio of the difference signal component is lowered by about 20 dB with respect to that of the monaural signal component, the effective reception region for the FM broadcasted wave is narrowed equivalently.

FIG. 15 shows another example of a prior art FM stereo receiver, in which 31 is an antenna; 32 is a local oscillator; 33 is a frequency converter; 34 is a band pass filter having a central frequency of 10.7 MHz; 35 is a limiter; 36 is a frequency detecting circuit (discriminator); 37 is a band pass filter having a pass band of 19 kHz; 38 is a subcarrier generating circuit; 39 is a band eliminating filter having a frequency eliminating band of 19 kHz; 40 is an electronic switch; 41 and 42 are low pass filters having a pass band of 0-15 kHz; 43 and 44 are de-emphasis circuits; 45 is a matrix circuit; 46 is a right output ER; and 47 is a left output EL; 40 to 45 constituting a stereo demodulating section 18.

Hereinbelow the operation of the prior art FM stereo receiver described above, will be explained. A high frequency signal received by the antenna 31 is applied to the frequency converter 33 together with an output of the local oscillator 32 to be converted in the frequency. An IF signal is obtained by making the output thereof pass through the band pass filter 34. This IF signal of FM modulated wave is applied to the discriminator with an amplitude kept constant by the limiter 35 and in this way the baseband signal EB given by Equation (1) is reproduced.

The baseband signal EB of stereo broadcasted wave can be expressed by Equation (16)

$$EB = EM + ES \cos 2\omega pt + P \cos \omega pt \qquad (16)$$

$$\text{where } EM \text{ (monaural signal)} = \tfrac{1}{2}(ER + EL) \qquad (17)$$

$$ES \text{ (stereo signal)} = \tfrac{1}{2}(ER - EL) \qquad (18)$$

and Pcosωpt:pilot signal

The frequency distribution of the baseband signal EB is indicated in FIG. 14, in which a stereo modulated wave of 38±15 kHz using a component of 38 kHz (2 fp) as a subcarrier is superposed on the monaural signal EM of 0-15 kHz and the pilot signal of fp=15 kHz is inserted therebetween.

The pilot signal fp=19 kHz expressed by the third term in Equation (16) is taken out by making this baseband signal EB pass through the band pass filter 37 and the subcarrier is reproduced by the subcarrier generating circuit 38 on the basis of this signal.

This subcarrier can be obtained either by squaring the pilot signal described above or by phase coupling of the oscillator of frequency 2 fp. By the first method, by squaring the pilot signal Pcosωpt $$P^2 \cos^2 \omega pt = P^2/2[1 + \cos 2\omega pt] \qquad (19)$$

is obtained and the component of the second term in Equation (19) is taken out through a band pass filter having a pass band of 38 kHz.

On the other hand, the output of the discriminator 36 is made pass through the band eliminating filter 39 for eliminating only the component expressed by the third term in Equation (16) and a signal EB' given by Equation (20) is obtained.

$$EB' = EM + ES \cos 2\omega pt \qquad (20)$$

The signal EB' is applied to the electronic switch 40 and switched by driving it by cos 2 •pt=1 and cos 2 ωpt=−1. In this way a signal having a waveform, in which the right output ER and the left output EL are switched at cos2ωpt=1 and cos2ωpt=−1, respectively, is obtained. However, at this time, since the magnitude of ES is multiplied theoretically only by $2/\pi$, it is compensated later by the matrix circuit 45.

The output of the electronic switch 40 is applied to the matrix circuit 45 through the low pass filters 41 and 42 as well as the de-emphasis circuits 43 and 45 to compensate the insufficient part (difference component) of ES described above, in order to obtain the ER and EL outputs.

However also the prior art FM stereo receiver described above has a following problem. That is, when noise having a flat frequency distribution is added to the received signal, the FM demodulated output of the discriminator 6 includes so-called triangular noise proportional to the frequency indicated by a broken line in FIG. 13. That is, supposing that the noise En added to the IF band before the FM demodulation is given by:

$$E_n = n \cos \omega_n t \quad (21)$$

and that the central frequency of the IF band is $\omega_i'$ ($=\omega_i + \omega O_2$), the noise $e_n$ after the FM demodulation corresponding to that given by Equation (21) is expressed by Equation (22).

$$e_n n(\omega n - \omega i') \sin(\omega n - \omega i')t \quad (22)$$

Putting $\omega n - \omega i' = \omega n'$ in the expression of the baseband, Equation (22) is transformed into Equation (23).

$$e_n = n\omega n' \sin \omega n' t \quad (23)$$

Equation (23) expresses so-called triangular noise, which has a distribution indicated by the broken line in FIG. 13. Therefore it had a problem that noise in the neighborhood of $\omega \approx 2\omega p$ is transformed into a low frequency at the stereo demodulation and lowers the SN ratio for the stereo signal ES. That is, when this noise is switched by means of the electronic switch 40, it is transformed into noise below 15 kHz and in this way the SN ratio is lowered with respect to that observed in the case where only the EM component is taken out from the output of the band eliminating filter.

OBJECT OF THE INVENTION

The object of the present invention is to solve the problematical points of the prior art techniques described above by receiving an FM stereo broadcasted wave so as to obtain a signal having an SN ratio at an approximately same level as that observed for a monaural signal so that it can be received equivalently with a high sensitivity.

SUMMARY OF THE INVENTION

In order to achieve the above object, an FM stereo receiving device according to the present invention comprises frequency converting means for converting a received signal of FM wave into an IF component signal having a predetermined intermediate frequency; first FM demodulating means for FM demodulating the IF component signal to output a subcarrier component signal and a baseband signal; stereo signal outputting means for outputting an FM stereo signal separated into a right side signal component and a left side signal component from the baseband signal, based on the subcarrier component signal; first switching output means for outputting the IF component signal while switching over two channels with a predetermined period, based on the subcarrier component signal; second FM demodulating means for FM-demodulating each signal of the two channels thus switched over to output each of demodulated signals; and second switching means for outputting the demodulated signals while switching over them with a predetermined period, based on the subcarrier component signal, and outputting the baseband signal, from which noise components are removed in the first switching output means, to the stereo signal outputting means.

BRIEF DESCRIPTION OF THE DRAWINGS

FIG. 7 is a vector diagram for explaining influences of noise in FM reception;

FIG. 10 is a timing chart for explaining the operation of the embodiment indicated in FIG. 8;

DETAILED DESCRIPTION

Figure 1:
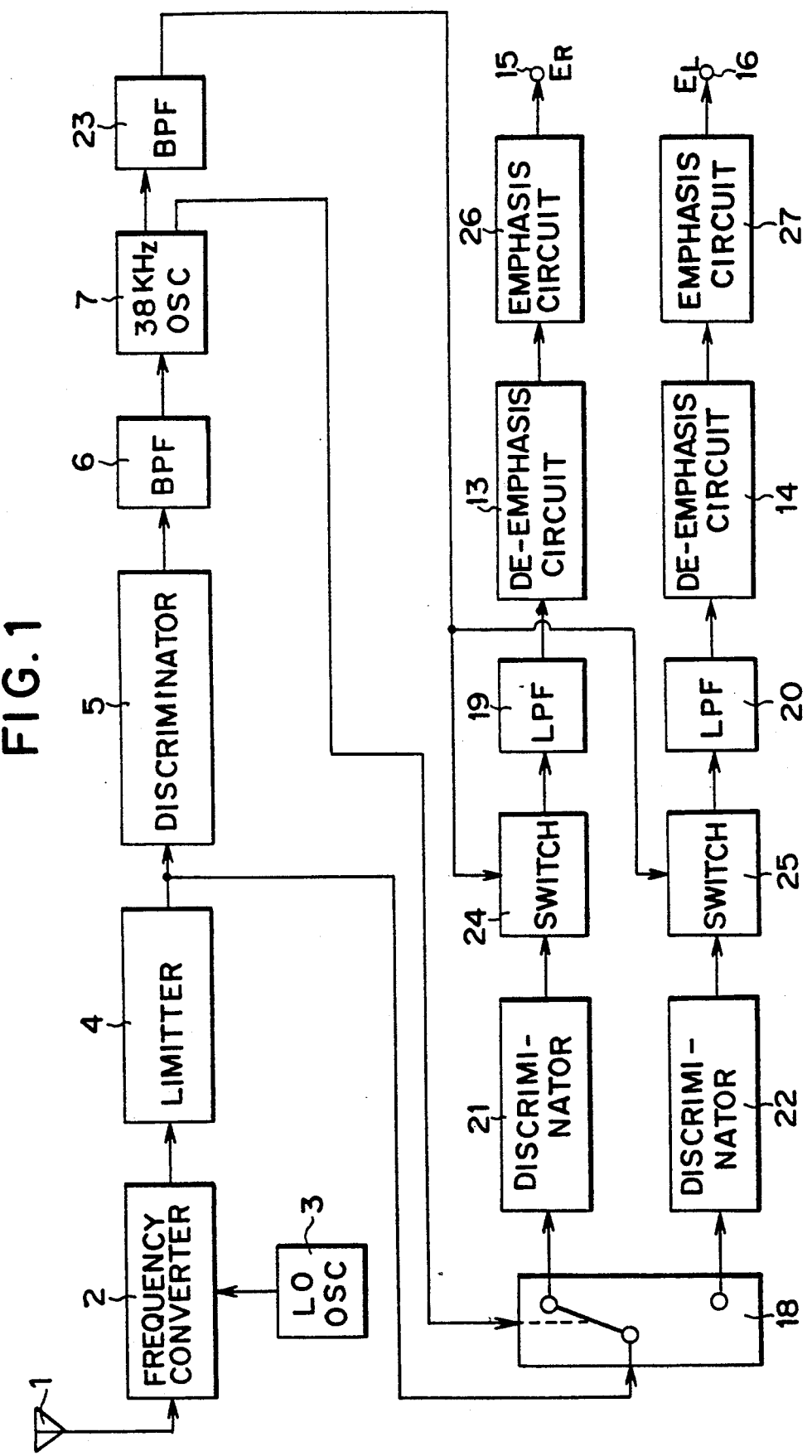
FIG. 1 is a block diagram showing the construction of a first embodiment of the FM stereo receiving device according to the present invention.

Hereinbelow several embodiments of the present invention will be explained, referring to the drawings.

Figure 13:
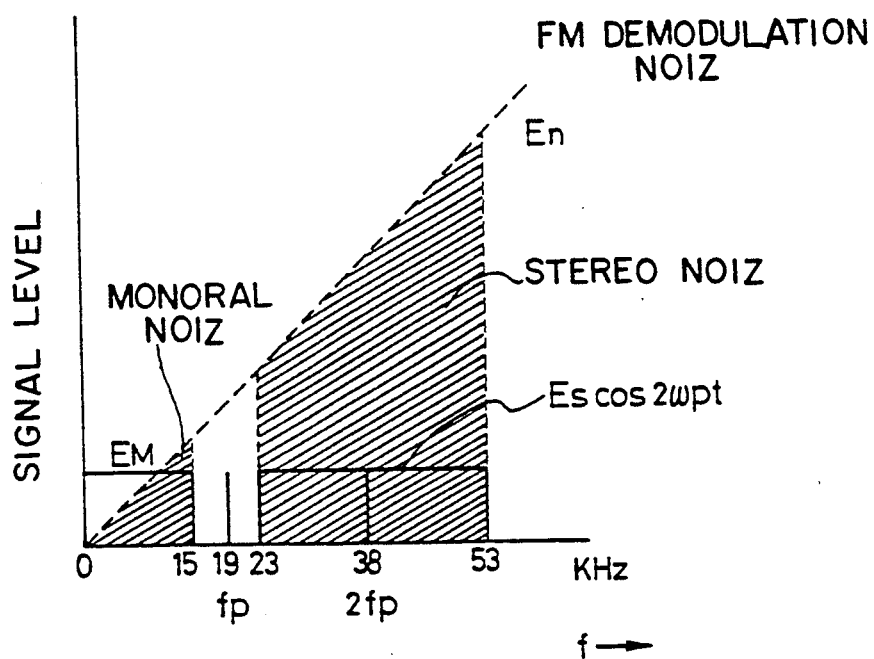
FIG. 13 is a characteristic scheme indicating a frequency distribution of the baseband signal EB and a frequency distribution of FM demodulation noise.

It is a property of the FM demodulation that noise is increased with increasing frequency by the FM demodulation in an FM receiver, as indicated in FIG. 13. That is, representing the carrier cosωct without modulation by a vector OA, as indicated in FIG. 7, when a noise vector having a frequency ωn is added thereto, a component in the direction B—B' perpendicular to the carrier vector OA, indicated by a broken line in FIG. 7, corresponds to noise after the FM demodulation.

Denoting random noise by $n\cos\omega nt$, the noise component described above with respect to the carrier frequency $\omega c$ varies in function of a difference between the two frequencies $(\omega n - \omega c)$. Consequently, in the FM $$n \sin(\omega n - \omega c)t \tag{1}$$

represents the disturbing component and in the FM demodulation it has a magnitude represented by Equation (2) described below, obtained by differentiating Equation (1);

$$n(\omega n - \omega c)\cos(\omega n - \omega c)t \tag{2}$$

$(\omega n - \omega c)$ in Equation (2) represents that demodulation noise is proportional to the frequency difference from the carrier.

Consequently, at the FM demodulation, if the carrier frequency is not 0 in the baseband signal in FIG. 13, but 2 fp, the SN ratio of the stereo signal is increased.

In view of the reason described above, the present invention proposes a switching system having a high SN ratio, for which a prior art switching system device is further improved. Therefore, at first the fundamental operation of the present invention will be explained.

The baseband signal EB of the FM is given by:

$$EB = EM + ES \cos 2\omega pt + P\cos \omega pt \tag{3}$$

$$EM = \tfrac{1}{2}\cdot(ER + EL) \tag{4}$$

$$\text{and } EL = \tfrac{1}{2}\cdot(ER - EL) \tag{5}$$

where ER is a right ear signal; EL is a left ear signal; $P\cos\omega pt$ is a pilot signal; EM is a monaural signal; and ES is a stereo signal.

Figure 6:
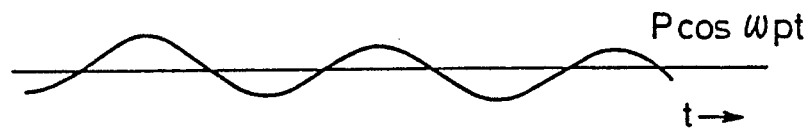
FIG. 6 shows waveforms indicating different signal components of the FM stereo signal and a switching pulse V(t)
Figure 6:
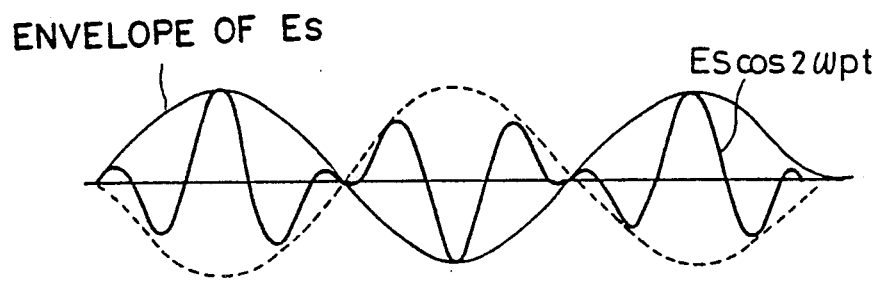
Figure 6:
Figure 6:
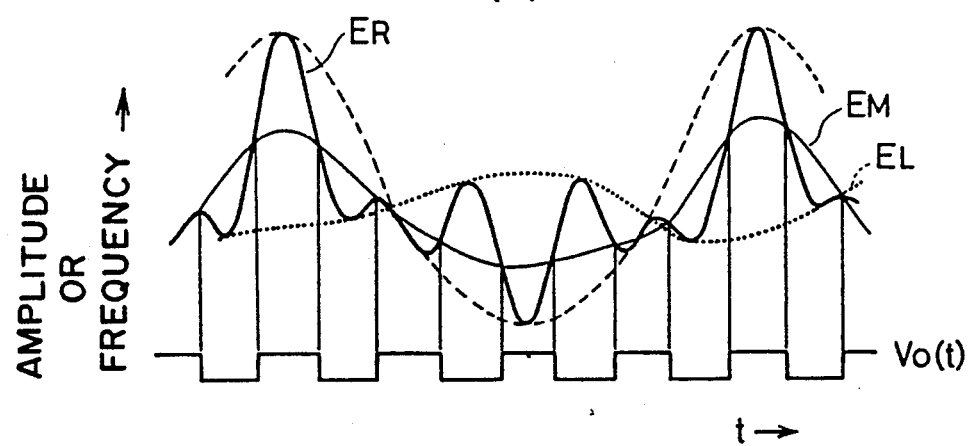

FIG. 6 shows an FM modulated wave FM-modulated with the baseband signal EB. In the figure, (a) indicates the pilot signal; (b) the stereo signal; (c) the monaural signal; (d) the synthesized baseband signal; and (e) a switching pulse V(t) of $\cos 2\omega pt$.

Figure 4:
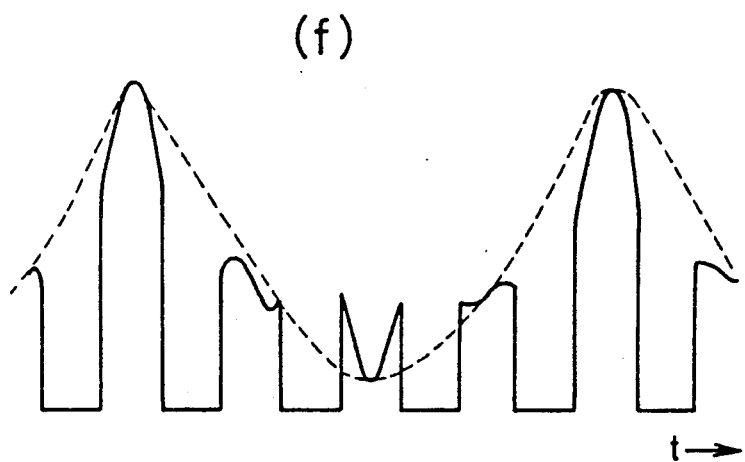
FIG. 4 shows a waveform indicating an FM demodulated wave intermittently switched according to the present invention.
Figure 5:
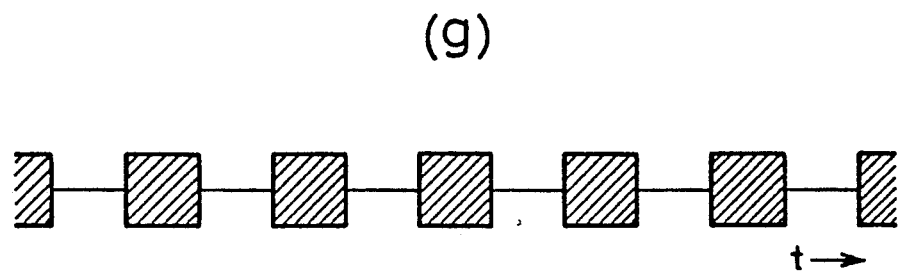
FIG. 5 shows a waveform indicating an FM demodulated wave intermittently switched according to the present invention.

If there exists surely the subcarrier $\cos 2\omega pt$ obtained from the pilot signal $P\cos\omega pt$ in the FM-modulated wave in FIG. 6, it is converted into an intermittent FM-modulated wave (g) by switching FM-modulated wave e.g. in the R channel, as indicated in FIG. 5, then the signal component indicated in FIG. 4 is obtained by FM-modulating it and ER' can be obtained by making it pass through a low pass filter.

$$ER = EM + ES \tag{6}$$

$$ER' = EM + kES \tag{7}$$

where $k < 1$.

$k < 1$ is required for the sinusoidal wave $\cos 2\omega pt$ in the multiplex and determined, depending on the switching period in the reception. EL' similar to ER' can be obtained also for the L channel.

ER and EL can be obtained through a circuit emphasizing the difference (ER'−EL') between the two signals, starting from ER' and EL'.

$$ER = \frac{ER'}{2}\left(1 + \frac{1}{k}\right) + \frac{EL'}{2}\left(1 - \frac{1}{k}\right) \tag{8}$$

$$= ER' + \frac{1}{2}\left(\frac{1}{k} - 1\right)(ER' - EL') \tag{9}$$

$$EL = ER' - \frac{1}{2}\left(\frac{1}{k} - 1\right)(ER' - EL') \tag{10}$$

On the other hand, denoting the switching pulse by the subcarrier $2\omega pt$ by V(t) (FIG. 6(e)), noise N(t), which is inputted in the FM demodulator, is given by:

$$N(t) = n\sin(\omega n - \omega c)t \cdot V(t) \tag{11}$$

Consequently the demodulation noise N'(t) in this case is obtained by differentiating Equation (11) as follows:

$$N'(t) = n\cdot(\omega n - \omega c)\cdot\cos(\omega n - \omega c)t\, V(t) + n\cdot d/dt(V(t))\cdot \sin(\omega n - \omega c)t \tag{12}$$

The first term $N_1$ of Equation (12) represents parts of triangular noise taken out intermittently by the switching pulse V(t), similarly to Equation (2). However, in this case, since the switching by the subcarrier $\cos 2\omega pt$ is terminated, e.g. a low pass filter of 15 kHz is sufficient for taking out ER' and high frequency noise has no influences.

Figure 3:
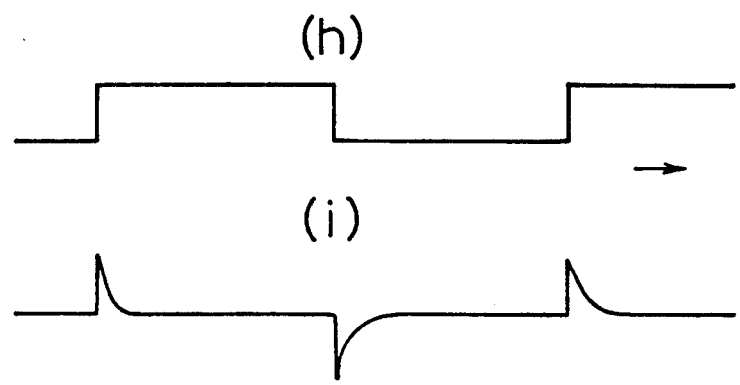
FIG. 3 shows waveforms indicating switching pulse V(t) used for realizing the present invention and a differential signal thereof.

The amplitude of the second term $N_2$ of Equation (12) is independent of the frequency $(\omega n - \omega c)$ but depends on dV(t)/dt. In general, in a signal processing under a band limitation, when the switching pulse V(t) is differentiated, the amplitude is great in the neighborhood of the switching, as indicated in FIG. 3. Consequently, if the part, where the amplitude of the differential signal dV(t)/dt of V(t) is great, is eliminated by means of a discriminator, noise mixed in the signal is decreased.

Figure 2:
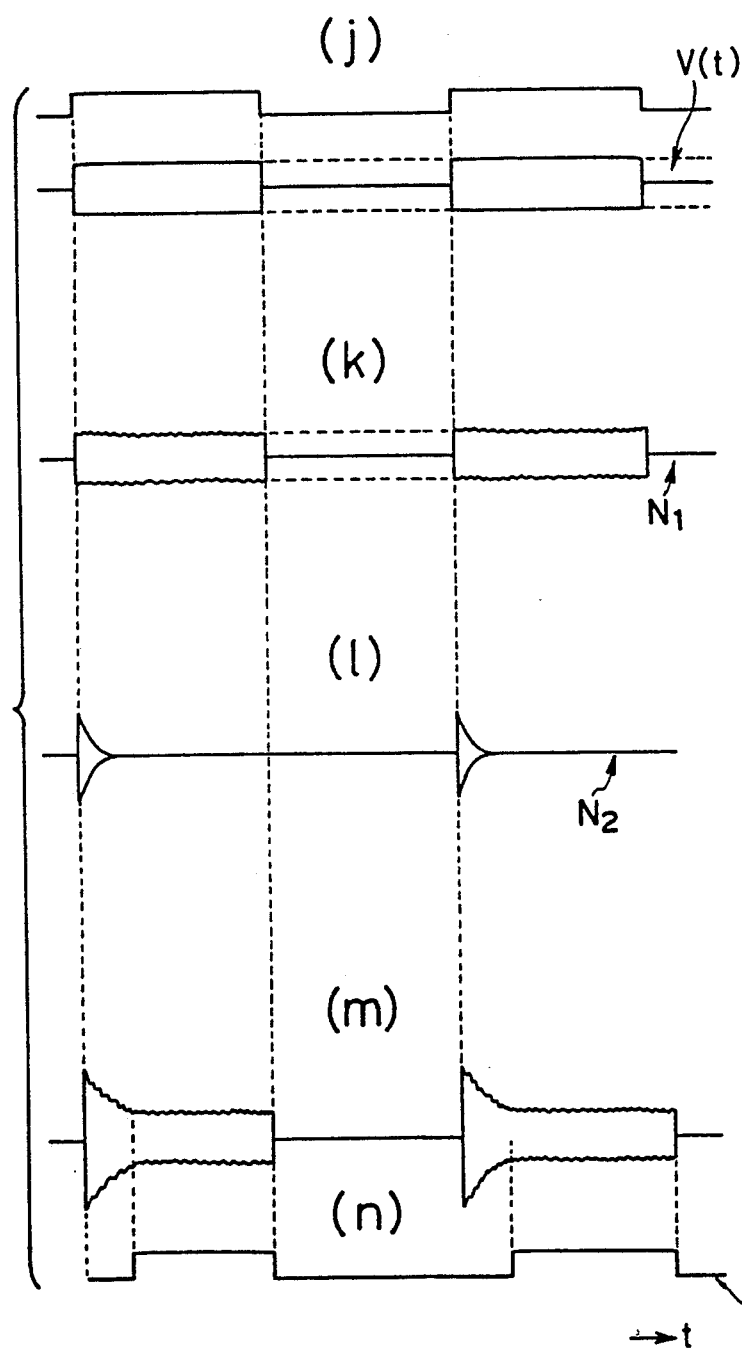
FIG. 2 shows waveforms indicating a distribution of switching noise for explaining the operation principle of the present invention and frequency spectrums.
Figure 2:
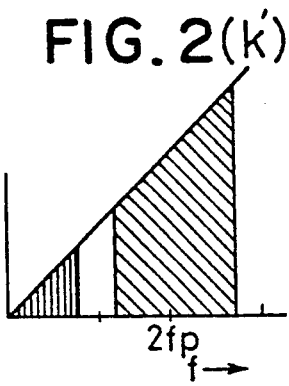
Figure 2:
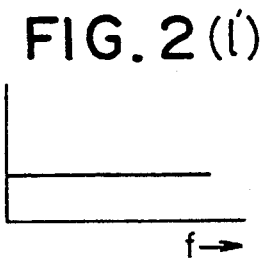
Figure 2:
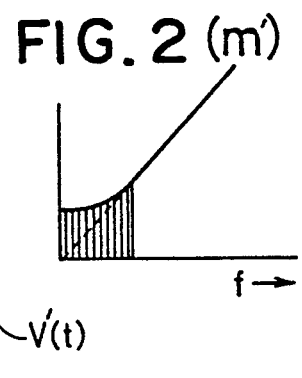

FIG. 2 shows distributions of V(t) and the switching noise thereof described above. In the prior art system, since switching is not effected in the step of the FM-modulated wave, the noise, given by Equation (1) described previously has a distribution indicated by a broken line in FIG. 2(j). The demodulation noise given by Equation (12) is represented by a full line and a broken line connected with each other in the same figure (k) and has a frequency distribution indicated in (k'). This noise, whose central frequency is 2 fp, lowers the SN ratio of the stereo signal.

Therefore, according to the present invention, since the FM-modulated wave represented by the full line in FIG. 2(j) is applied to the discriminator in FIG. 2(j), as described later, the demodulation noise thereof is given by the first and the second term of Equation (12) and it is that indicated in FIG. 2(k), (k'), (l) and (l').

That is, the first term described above shows that random noise is produced only in the period of V(t) in time, as indicated in FIG. 2(k) and the frequency distribution thereof is that of the triangular noise indicated in (k') of the same figure. Further, as indicated in FIG. 2(l) the second term represents noise given by an envelope of dV(t)/dt and the frequency distribution is uniform, as indicated in (l') of the same figure. A synthesized wave of FIG. 2(k) and (l) is given by (m) and the frequency distribution is indicated in (m').

As described later, according to the present invention, it is necessary to switch the output of the discriminator with a pulse V'(t) narrower than the switching pulse V(t) described previously, as indicated in FIG.

2(n) so that noise component is represented only by a hatched region in (m') of the same figure in the noise spectrum indicated in FIG. 2(k').

Figure 14:
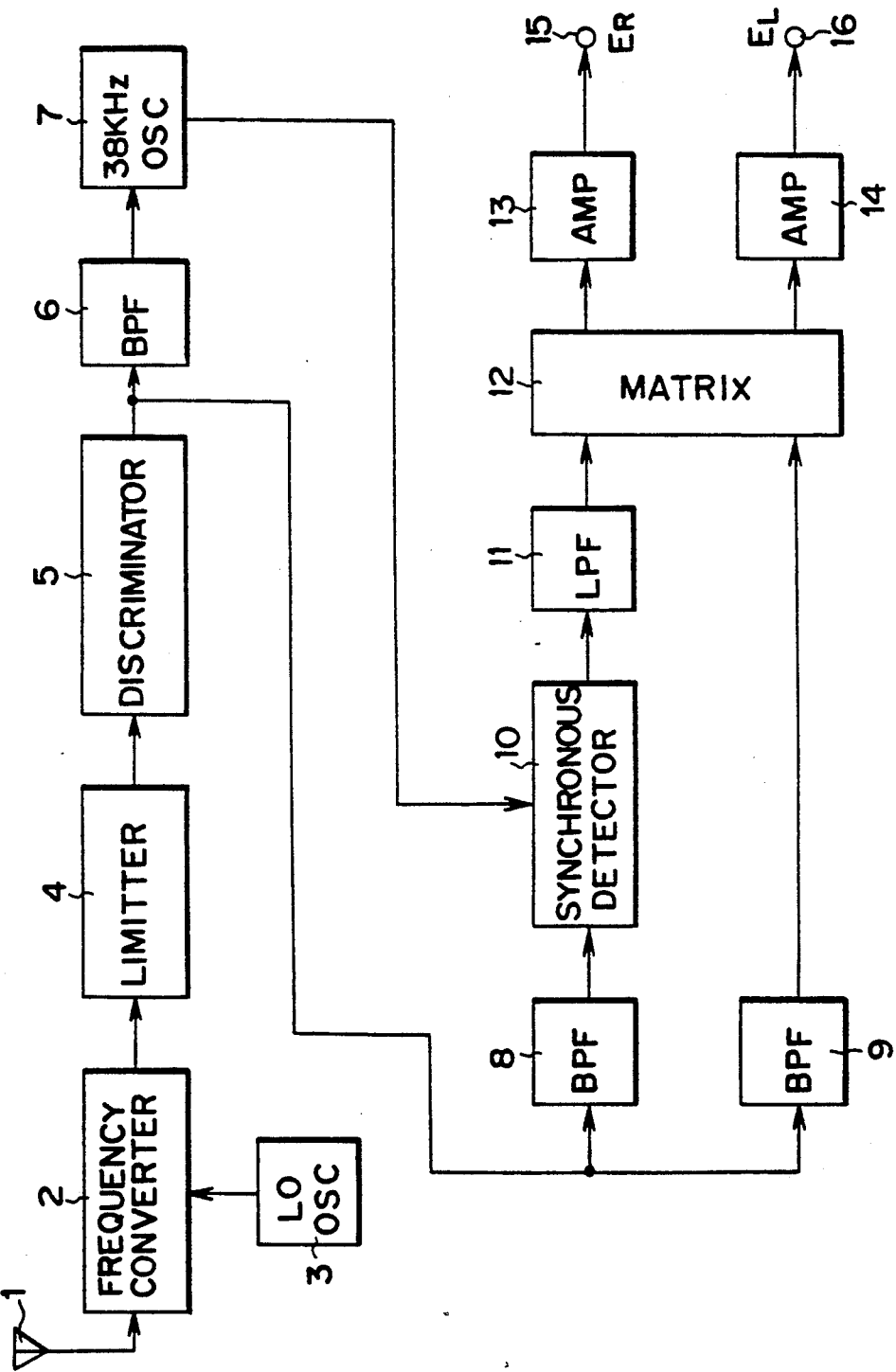
FIGS. 14 and 15 are block diagrams showing the construction of prior art different FM stereo receivers.

The embodiment of the present invention indicated in FIG. 1 stated previously concretizes the principle of the operation described above. FIG. 1 is a scheme showing a first embodiment of the FM stereo receiving device according to the present invention, in which same reference numerals as those used in FIG. 14 represent circuits identical or similar thereto; 21 and 22 are discriminators; 23 is a band pass filter; 24 and 25 are switches; and 26 and 27 are emphasis circuits. In the above embodiment the IF signal from the limiter 4 is applied to the electronic switch 18.

Further the IF signal stated above is applied also to the discriminator 5 to be FM-detected there and the baseband signal is sent to the band pass filter 6. The filter 6 extracts the pilot component signal fp from the baseband signal to give it to the 2 fp oscillator 7 and sends the 2 fp signal cos2ωpt (subcarrier component signal) to the electronic switch 18 and the band pass filter 23 as the switching pulse V(t) described above.

The electronic switch 18 switches the IF signal intermittently, responding to V(t) to output the first and the second switch pulse consisting of the IF signal during predetermined periods around cos2ωpt=1 and −1, respectively. The first and the second switch pulse are applied to the discriminators 21 and 22, respectively, and the first and the second intermittent detected signal, which are components of the baseband signal, which is the FM-detected output thereof, are given to the switches 24 and 25.

On the other hand, the band pass filter 23 eliminates the dV(t)/dt component from the 2 fp signal V(t) described above to form a predetermined zero cross pulse signal V'(t) and sends this pulse signal to the switches 24 and 25. Consequently the switches 24 and 25 output aural signals while switching the first and the second intermittent detected signal, responding to the pulse signal described above. In this way, as described previously, the noise given by the second term in Equation (12) is eliminated.

The aural signals from the switches 24 and 25 are given to the low pass filters 19 and 20 so as to extract only low frequency components. In this way the right ear signal ER and the left ear signal EL are obtained through the de-emphasis circuits 13 and 14, respectively.

In this case, the emphasis circuits 26 and 27 process the difference signal components in the switching system indicated by Equations (9) and (10) stated previously, respectively. Thus the difference signal (ER'−EL') is added to ER' and subtracted from EL', as indicated by Equations (9) and (10). These emphasis circuits are not always necessary, but they can be omitted.

Figure 8:
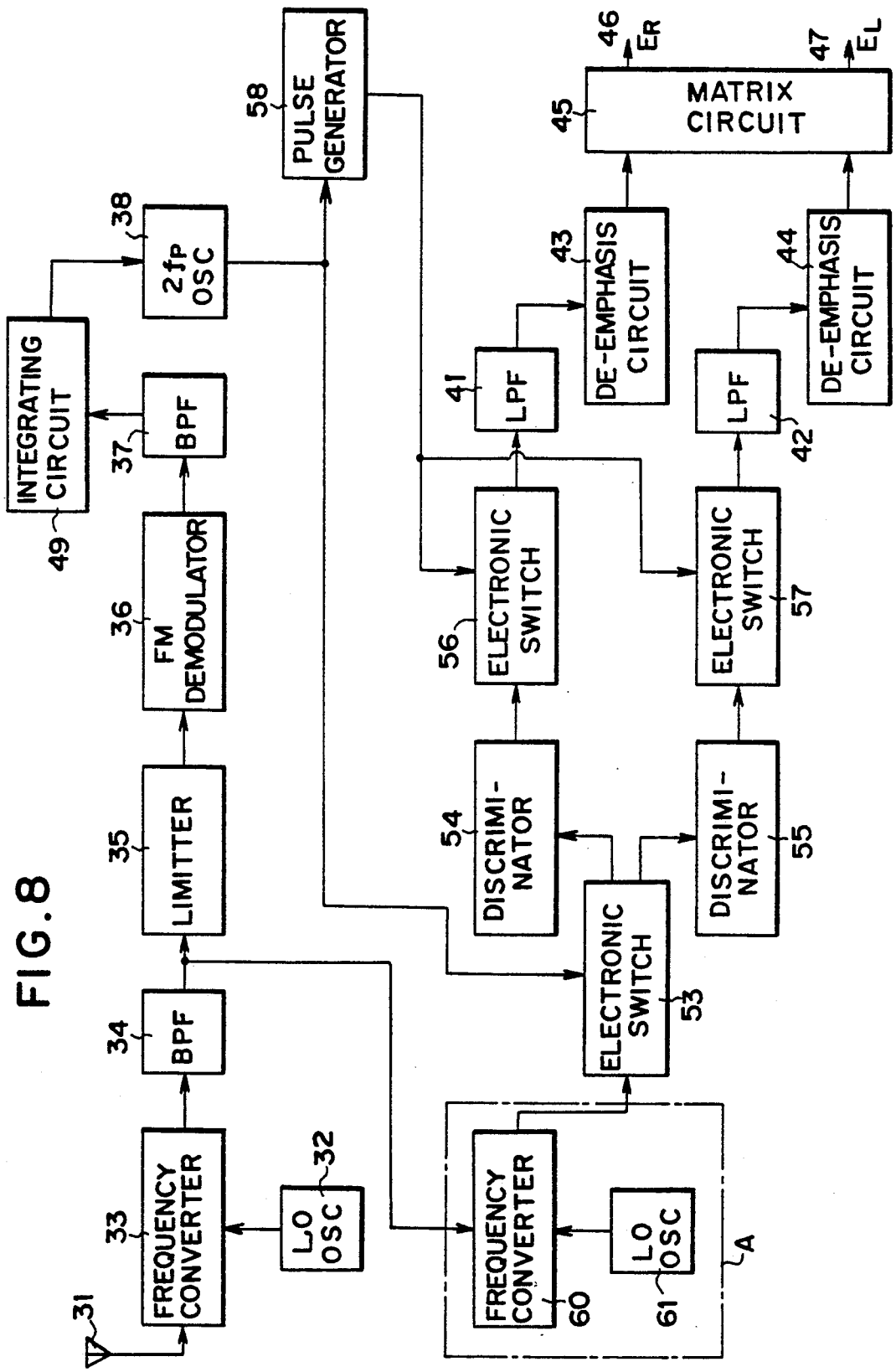
FIG. 8 is a block diagram showing a second embodiment of the present invention.
Figure 15:
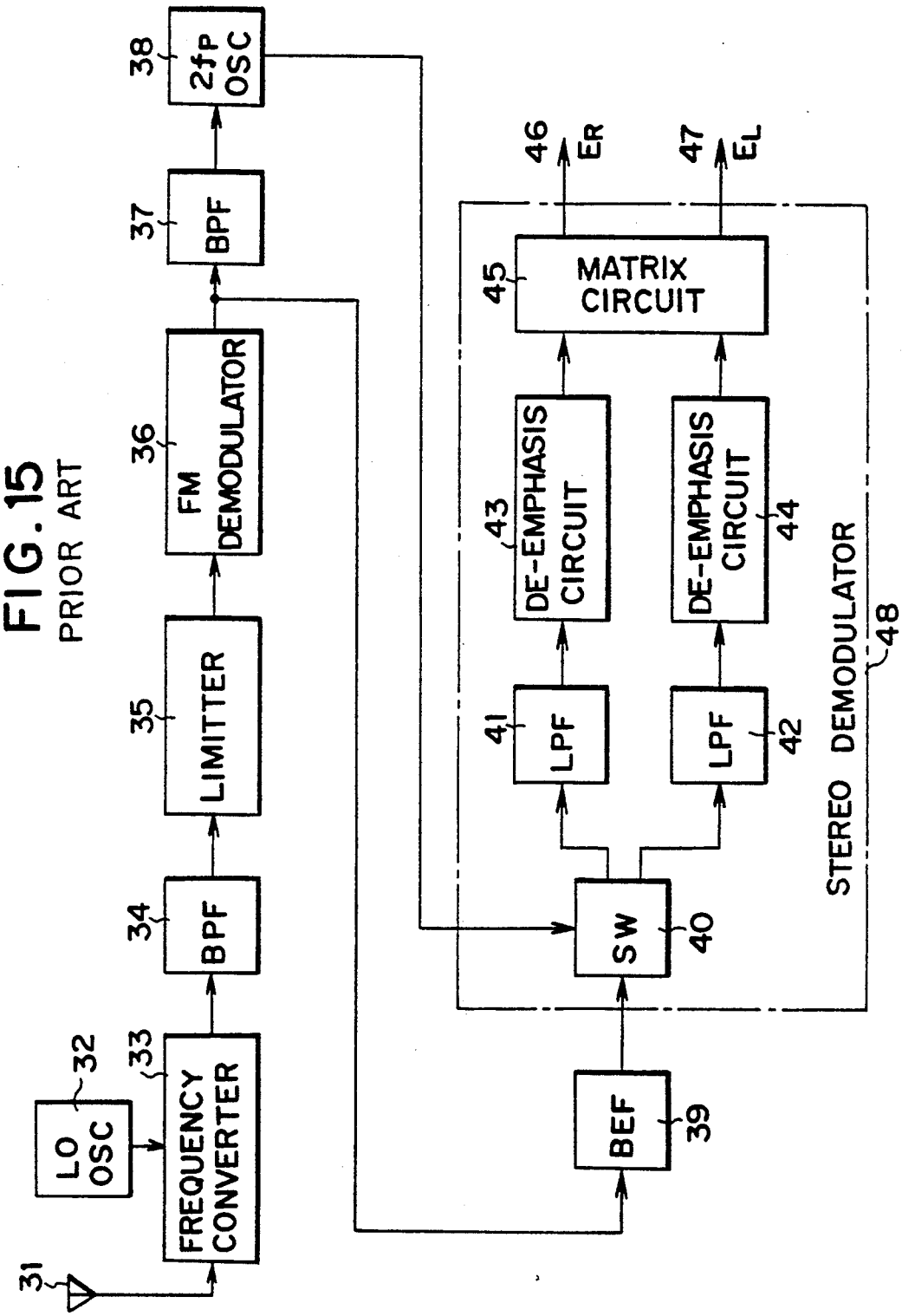

Next FIG. 8 shows a second embodiment of the FM stereo receiving device according to the present invention. A feature of this embodiment is that the FM demodulation is effected not after the IF conversion, as by the prior art technique, but it is effected after having separated the FM modulated wave of the IF signal into ER and EL on the basis of the subcarrier, similarly to the preceding embodiment. In the figure, same reference numerals as those used in FIG. 15 represent circuits identical or similar thereto; 49 is an integrating circuit for the cosωpt signal; 53 is an electronic switch; 54 and 55 are discriminators; 56 and 57 are transient noise suppressing switches; 58 is a $\tau_2$ pulse generating circuit; 60 is a frequency converter; and 61 is a local oscillator.

In the embodiment described above, an output of the discriminator 36 is applied to the band pass filter 37 to take out the pilot signal fp. Although it may be applied directly to the subcarrier generating circuit 38, it may be applied thereto also through the integrating circuit 49 for extracting more stably the subcarrier component cosωpt.

Figure 9:
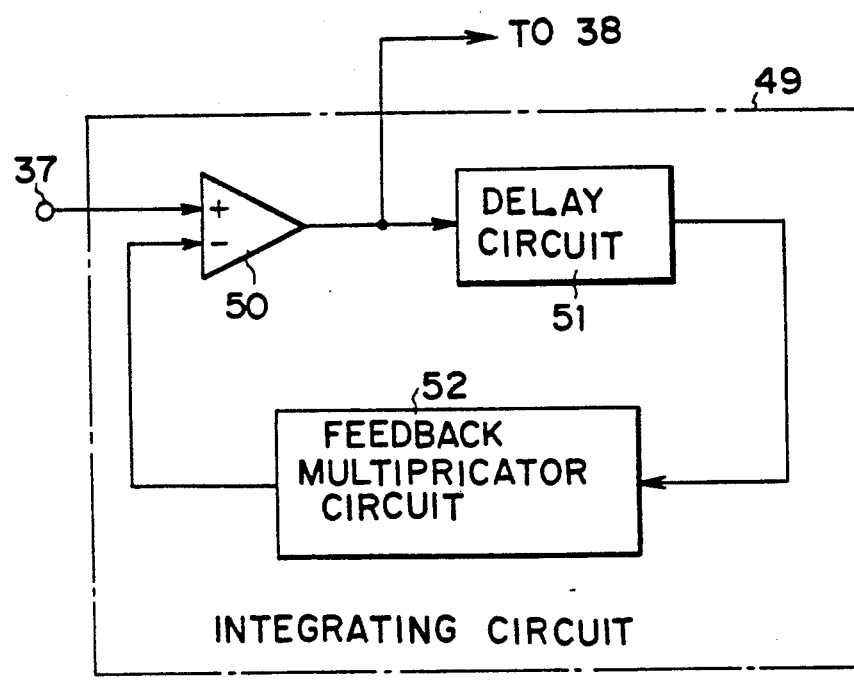
FIG. 9 is a block diagram showing an example of the construction of an integrating circuit used in the embodiment indicated in FIG. 8.

FIG. 9 shows an example of a concrete construction of the integrating circuit 49. In this figure, 50 is differential amplifier; 51 is a delay circuit having a delay time $\tau_3 \frac{1}{2} fp = 26$ μs; and 52 is a feedback multiplicator circuit. The integration time for cosωpt is varied by varying the feedback multiplicator by means of this circuit 52. The phase of the output of the differential amplifier 50 is varied by 180° in $\tau_3$.

The frequency of the output of the band pass filter 34 is increased by a frequency $f_{o2}$ of the local oscillator 31 by means of the frequency converter 60 and it is applied to the electronic switch 53 as an IF signal IF' having the increased frequency. The electronic switch 53 is driven by the subcarrier cosωpt described above and outputs the IF signal IF' to two systems while switching it. This processing is similar to the switching at the stereo demodulation after the FM demodulation in the prior art system described previously and what is different therefrom is only that the object to be switched is the IF signal. Consequently the waveform thereof can be seen in FIG. 10(a), in which the ordinate represents the frequency.

In this way the IF signal IF' as indicated in FIG. 10(a) is divided into the right FM wave ER and the left FM wave EL by switching the electronic switch 23 by using switch pulses (pulse width $\tau_1 \frac{1}{2} fp$) around cos2ωpt = +1 and cos2ωpt = −1 in (c) of the same figure, which are applied to the discriminators 54 and 55. Respective outputs are switched by a pulse having a pulse width $\tau_2$ indicted in FIG. 10(d) generated in the pulse generating circuit 58 by the electronic switches 56 and 57. In this way switching noise produced in the neighborhood of cos2ωpt=0 (FIG. 10(b)) by the switching of the IF signal as indicated in (c) of the same figure by cos2ωpt in FIG. 10(c) described previously can be suppressed. The outputs of the electronic switches 56 and 57 are processed by a method similar to the prior art method described previously after the low pass filter 41 and 42, respectively, to obtain the left and the right stereo signal ER and EL.

However, in the present embodiment, when the output of a certain channel (e.g. ER) is considered, the noise En indicated in Equation (6) described previously can be rewritten as Equation (9)

$$En = n \cos \omega nt \cdot V(t) \tag{13}$$

where V(t) represents a pulse train having a period of $\frac{1}{4}$ fp indicated in FIG. 10(c).

$$V(t) = \sum_{n=0}^{\infty} \cos(2n + 1) 2\omega pt \tag{14}$$

Consequently, FM-demodulating Equation (13), the noise en' at that time is given by Equation (15)

$$en' = n\omega'n\sin\omega'nt \cdot V(t) + \frac{dV(t)}{dt} \cdot n\cos\omega'nt \quad (15)$$

Since the noise en' stated above includes only stereo-demodulated low frequency components in the triangular noise described previously, which are at low levels, owing to the low pass filter 11, through which it has passed, the SN ratio of the stereo signal is increased. Further it is for eliminating parts having great amplitudes of dV(t)/dt in the second term in Equation (15) that the electronic switches 56 and 57 are switched-on only during $\tau_2$ by output pulses of the pulse generating circuit 58 (FIG. 10(d)).

In this way worsening in the SN ratio of the left and right stereo signals ER and EL is reduced with respect to that observed for the monaural component EM, which is not stereo demodulated, and the worsening in the SN ratio is slight even for reception at weak electric field. Therefore it is possible to effect stereo reception with an SN ratio at an almost same level as that obtained by the monaural EM reception.

Figure 11:
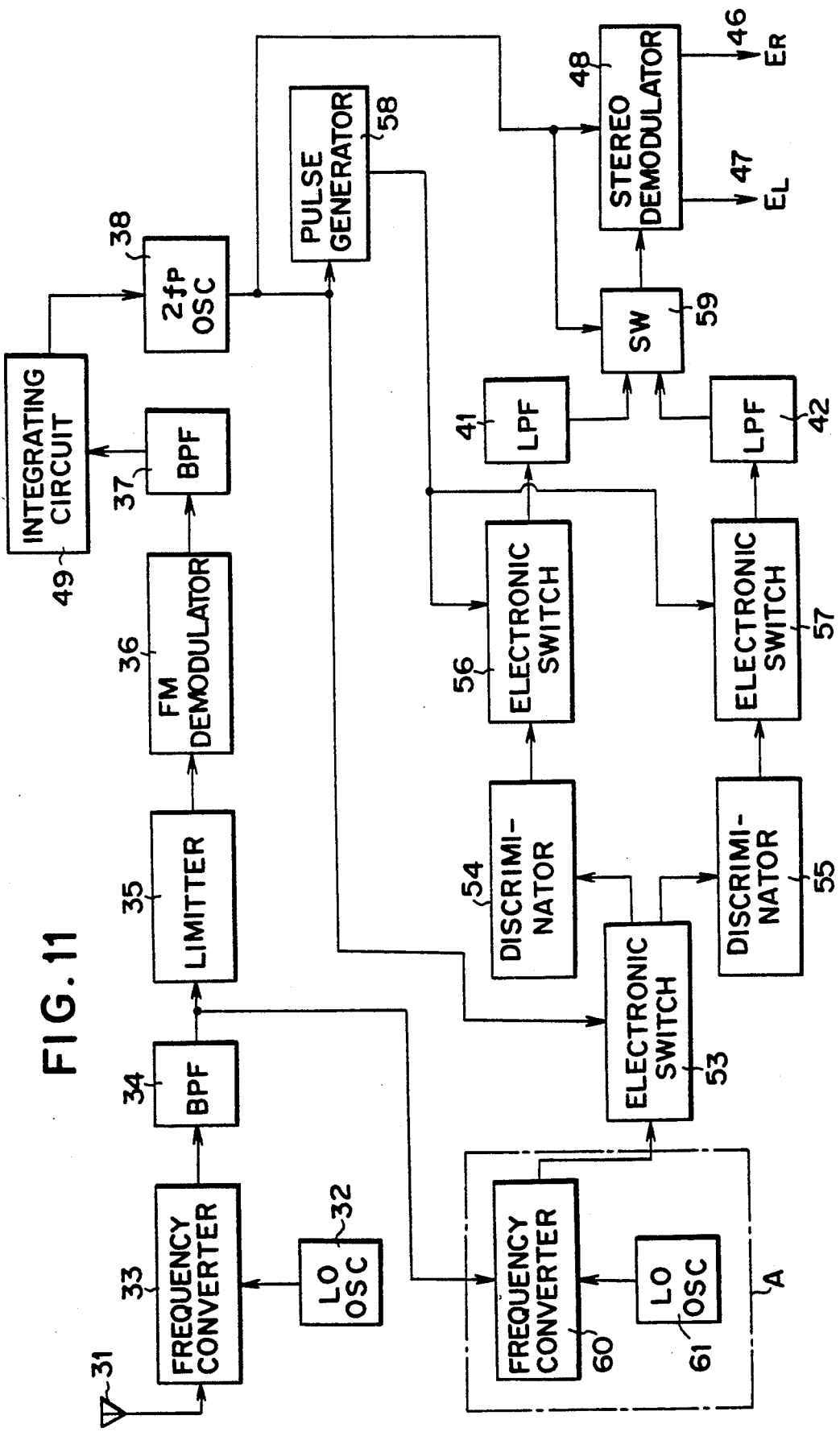
FIG. 11 is a block diagram showing a third embodiment of the present invention.

FIG. 11 shows a third embodiment of the present invention, in which there are disposed an electronic switch 59 and the stereo demodulating section 48 of the prior art device described previously after the low pass filters 41 and 42 in the embodiment indicated in FIG. 8 so that the electronic switch 59 is driven by switch pulses having the phase of the subcarrier.

In the embodiment indicated in FIG. 11, the baseband signal of two channels obtained by making ER and EL from the switches 56 and 57 pass through the low pass filters 41 and 42, respectively, is applied to the electronic switch 59. The electronic switch 59 is driven by pulses having a waveform indicated in FIG. 10(c). EB' described above is generated by switching ER and EL by 2 fp=38 kHz of the subcarrier and applied to the stereo demodulating section 48.

By using a system as described above it is possible to reduce further modifications of the prior art FM stereo receiver.

Figure 12:
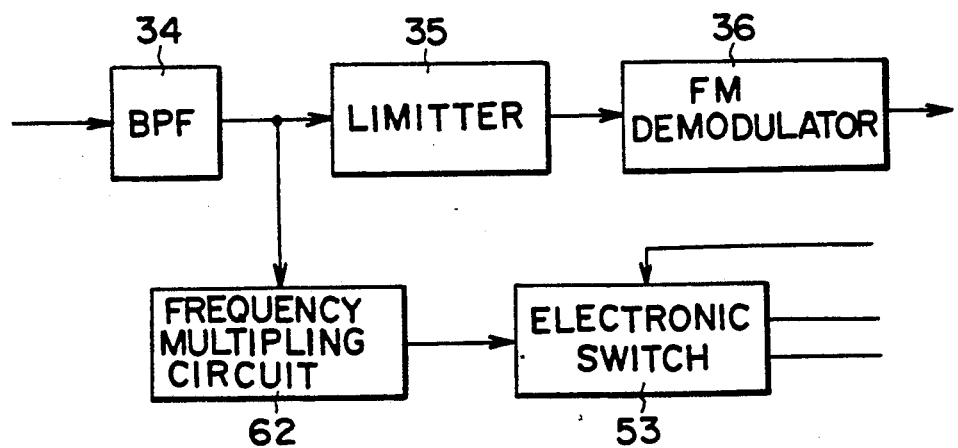
FIG. 12 is a block diagram showing an example of variations using a frequency multiplying circuit instead of a frequency converting circuit in the embodiment indicated in FIG. 8.

Further, although, in the embodiments indicated in FIGS. 8 and 11, the frequency converting circuit A is used for converting the frequency fi of the IF signal into fi', a frequency multiplying circuit 62 can be used instead thereof, as indicated in FIG. 12. In this case, discriminators 54 and 55 are used, which have frequency detecting characteristics different from those of the discriminator 36. When this frequency multiplying circuit 62 is used instead of the frequency converting circuit, since the frequency shift of the FM signal is greater than that obtained by means of the frequency converting circuit A, a discriminator satisfying such a condition should be used therefor.

Further it is for reducing discontinuous noise produced in the IF signal, accompanied by this switching, that the signal is not switched by the electronic switch 23 at that frequency fi as it is.

The frequency fi of the IF signal for a usual FM receiver is 10.7 MHz. Even if the rise of the rectangular wave of the subcarrier cos2ωpt (38 kHz) supplied by the subcarrier generating circuit 38 is abrupt, since it is independent from the phase of the carrier for the IF signal and the IF signal is an FM-modulated wave, the rise and the fall of cos2ωpt switching it are not in synchronism in the phase therewith.

In the carrier of 10.7 MHz there are about 140.8 waves in a period of time of the switching time $\tau_1$ (13.158 μs) by the rectangular wave of cos2ωpt (38 kHz). However this number of waves is increased or decreased due to the switching timing and not only transient response of the noise component described above but also edges of the signal component are worsened.

On the contrary, by the present embodiment, as described previously, by increasing the frequency of the IF signal from fi to fi', it is possible to shorten variable portions of the edges of the signal components and to elongate $\tau_2$ in FIG. 10(d). Further, although, in the different embodiments of the present invention, the frequency converting circuit A and the frequency multiplying circuit 62 are used, the device may be so constructed that these are omitted and the output of the BPF 4 is switched directly by the switch 23.

As explained above, contrarily to the fact that the SN ratio of the stereo signal is lowered by the triangular noise produced at the FM demodulation by the prior art system, according to the present invention, since the ER component is separated from the EL component after the conversion into the IF signal in the IF band (FM-modulated wave) and thereafter it is FM-demodulated and only low frequency components of 0-15 kHz are taken out, it is possible to obtain a stereo signal, for which worsening in the SN ratio is small.

What is claimed is:

1. An FM stereo receiving device comprising: frequency converting means for converting a received signal of FM wave into an IF component signal having a predetermined intermediate frequency; first FM demodulating means for FM-demodulating said IF component signal to output a subcarrier component signal and a baseband signal; stereo signal outputting means for outputting an FM stereo signal divided into a right side signal component and a left side signal component from said baseband signal, based on said subcarrier component signal first switching output means for outputting said IF component signal while switching over two channels with a predetermined period, based on said subcarrier component signal; second FM demodulating means for FM-demodulating each signal of said two channels thus switched to output respective demodulated signals; and second switching means for outputting said demodulated signals while switching over them with a predetermined period, based on said subcarrier component signal, and outputting said baseband signal, from which noise components are removed in said first switching output means, to said stereo signal outputting means; further comprising frequency multiplying means which multiplies said IF component signal from said frequency converting means so as to obtain a predetermined high frequency component signal, and which outputs said high frequency component signal to said first switching output means.

2. An FM stereo receiving device according to claim 1, wherein said frequency multiplying means includes a local oscillator section outputting a predetermined oscillation frequency signal and a frequency converter section which converts said IF component signal into said high frequency component signal having a frequency, which is higher by an oscillation frequency of said oscillation frequency signal.

3. An FM stereo receiving device according to claim 1, wherein said first FM demodulating means includes an integrating processing circuit having a differential amplifier section, a delaying section for delaying an output of said differential amplifier section by a predetermined delay time based on said subcarrier component signal, and a variable coefficient section which feeds back an output of said delaying section to said differential amplifier section, said circuit integrating said baseband signal to output a subcarrier component signal.

4. An FM stereo receiving device according to claim 1, further comprising a pulse signal outputting section outputting a pulse signal, which has a frequency about twice as high as a subcarrier frequency, as said subcarrier component signal to said first switching output means, and outputting a pulse signal having a frequency which is about four times as high as the subcarrier frequency to said second switching output means.

5. An FM stereo receiving device according to claim 1, further comprising signal synthesizing means which synthesizes each baseband signal outputted by said second switching means in response to said subcarrier component signal, and outputs the baseband signal thus synthesized to said stereo signal outputting means.

6. An FM stereo receiving device according to claim 5, wherein said signal synthesizing means includes third switching output means in which each said baseband signal is inputted and which outputs the baseband signal thus synthesized, said third switching output means being driven with the same period as said first switching output means by said subcarrier component signal.

7. An FM stereo receiving device according to claim 1, wherein said first FM demodulating means includes an integrating processing circuit having a differential amplifier section, a delaying section for delaying an output of said differential amplifier section by a predetermined delay time based on said subcarrier component signal, a variable coefficient section which feeds back an output of said delaying section to said differential amplifier section, said circuit integrating said baseband signal to output a subcarrier component signal, and a pulse signal outputting section outputting a pulse signal, which has a frequency about twice as high as a subcarrier frequency, as said subcarrier component signal to said first switching output means, and outputting a pulse signal having a frequency which is about four times as high as the subcarrier frequency to said second switching output means.

8. An FM stereo receiving device according to claim 7, wherein said stereo signal outputting means includes signal emphasizing means which obtains a difference signal component between said right side signal and said left side signal and emphasizes said difference signal component.

9. An FM stereo receiving device comprising: frequency converting means for converting a received signal of FM wave into an IF component signal having a predetermined intermediate frequency; first FM demodulating means for FM-demodulating said IF component signal to output a subcarrier component signal and a baseband signal; stereo signal outputting means for outputting an FM stereo signal divided into a right side signal component and a left side signal component from said baseband signal, based on said subcarrier component signal first switching output means for outputting said IF component signal while switching over two channels with a predetermined period, based on said subcarrier component signal; second FM demodulating means for FM-demodulating each signal of said two channels thus switched to output respective demodulated signals; and second switching means for outputting said demodulated signals while switching over them with a predetermined period, based on said subcarrier component signal, and outputting said baseband signal, from which noise components are removed in said first switching output means, to said stereo signal outputting means; wherein said first FM demodulating means includes an integrating processing circuit having a differential amplifier section, a delaying section for delaying an output of said differential amplifier section by a predetermined delay time based on said subcarrier component signal, and a variable coefficient section which feeds back an output of said delaying section to said differential amplifier section, said circuit integrating said baseband signal to output a subcarrier component signal.

10. An FM stereo receiving device comprising: frequency converting means for converting a received signal of FM wave into an IF component signal having a predetermined intermediate frequency; first FM demodulating means for FM-demodulating said IF component signal to output a subcarrier component signal and a baseband signal; stereo signal outputting means for outputting an FM stereo signal divided into a right side signal component and a left side signal component from said baseband signal, based on said subcarrier component signal first switching output means for outputting said IF component signal while switching over two channels with a predetermined period, based on said subcarrier component signal; second FM demodulating means for FM-demodulating each signal of said two channels thus switched to output respective demodulated signals; and second switching means for outputting said demodulated signals while switching over them with a predetermined period, based on said subcarrier component signal, and outputting said baseband signal, from which noise components are removed in said first switching output means, to said stereo signal outputting means; further comprising a pulse signal outputting section outputting a pulse signal, which has a frequency about twice as high as a subcarrier frequency, as said subcarrier component signal to said first switching output means, and outputting a pulse signal having a frequency which is about four times as high as the subcarrier frequency to said second switching output means.

11. An FM stereo receiving device comprising: frequency converting means for converting a received signal of FM wave into an IF component signal having a predetermined intermediate frequency; first FM demodulating means for FM-demodulating said IF component signal to output a subcarrier component signal and a baseband signal; stereo signal outputting means for outputting an FM stereo signal divided into a right side signal component and a left side signal component from said baseband signal, based on said subcarrier component signal first switching output means for outputting said IF component signal while switching over two channels with a predetermined period, based on said subcarrier component signal; second FM demodulating means for FM-demodulating each signal of said two channels thus switched to output respective demodulated signals; and second switching means for outputting said demodulated signals while switching over them with a predetermined period, based on said subcarrier component signal, and outputting said baseband signal, from which noise components are removed in said first switching output means, to said stereo signal outputting means; further comprising signal synthesizing means which synthesizes each baseband signal outputted by said second switching means in response to said subcarrier component signal, and outputs the baseband signal thus synthesized to said stereo signal outputting means.

12. An FM stereo receiving device comprising: frequency converting means for converting a received signal of FM wave into an IF component signal having a predetermined intermediate frequency; first FM demodulating means for FM-demodulating said IF component signal to output a subcarrier component signal and a baseband signal; stereo signal outputting means for outputting an FM stereo signal divided into a right side signal component and a left side signal component from said baseband signal, based on said subcarrier component signal first switching output means for outputting said IF component signal while switching over two channels with a predetermined period, based on said subcarrier component signal; second FM demodulating means for FM-demodulating each signal of said two channels thus switched to output respective demodulated signals; and second switching means for outputting said demodulated signals while switching over them with a predetermined period, based on said subcarrier component signal, and outputting said baseband signal, from which noise components are removed in said first switching output means, to said stereo signal outputting means; further comprising signal synthesizing means which synthesizes each baseband signal ouputted by said second switching means in response to said subcarrier component signal, and outputs the baseband signal thus synthesized to said stereo signal outputting means, wherein said signal synthesizing means includes third switching output means in which each said baseband signal is inputted and which outputs the baseband signal thus synthesized, said third switching output means being driven with the same period as said first switching output mean by said subcarrier component signal.

13. An FM stereo receiving device comprising: frequency converting means for converting a received signal of FM wave into an IF component signal having a predetermined intermediate frequency; first FM demodulating means for FM-demodulating said IF component signal to output a subcarrier component signal and a baseband signal; stereo signal outputting means for outputting an FM stereo signal divided into a right side signal component and a left side signal component from said baseband signal, based on said subcarrier component signal first switching output means for outputting said IF component signal while switching over two channels with a predetermined period, based on said subcarrier component signal; second FM demodulating means for FM-demodulating each signal of said two channels thus switched to output respective demodulated signals; and second switching means for outputting said demodulated signals while switching over them with a predetermined period, based on said subcarrier component signal, and outputting said baseband signal, from which noise components are removed in said first switching output means, to said stereo signal outputting means; wherein said first FM demodulating means includes an integrating processing circuit having a differential amplifier section, a delaying section for delaying an output of said differential amplifier section by a predetermined delay time based on said subcarrier component signal, a variable coefficient section which feeds back an output of said delaying section to said differential amplifier section, said circuit integrating said baseband signal to output a subcarrier component signal, and a pulse signal outputting section outputting a pulse signal, which has a frequency about twice as high as a subcarrier frequency, as said subcarrier component signal to said first switching output means, and outputting a pulse signal having a frequency which is about four times as high as the subcarrier frequency to said second switching output means.

14. An FM stereo receiving device according to claim 13, wherein said stereo signal outputting means includes signal emphasizing means which obtains a difference signal component between said right side signal and said left side signal and emphasizes said difference signal component.

* * * * *

UNITED STATES PATENT AND TRADEMARK OFFICE
CERTIFICATE OF CORRECTION

PATENT NO. : 5 179 593
DATED : January 12, 1993
INVENTOR(S) : Haruo SAKATA

It is certified that error appears in the above-identified patent and that said Letters Patent is hereby corrected as shown below:

```
Column 10, line 38; change "signal" to ---signal;---.
Column 11, line 61; change "signal" to ---signal;---.
Column 12, line 25; change "signal" to ---signal;---.
           line 55; change "signal" to ---signal;---.
Column 13, line 15; change "signal" to ---signal;---.
Column 14, line  7; change "signal" to ---signal;---.
```

Signed and Sealed this

Ninth Day of November, 1993

Attest:

BRUCE LEHMAN

Attesting Officer        Commissioner of Patents and Trademarks